(No Model.)

J. THOMSON.
PROPORTIONAL WATER METER.

No. 515,378.  Patented Feb. 27, 1894.

Witnesses
Jno. G. Hinkel
H. N. Dobson

Inventor
John Thomson
By
Foster Freeman
Attorneys

UNITED STATES PATENT OFFICE.

JOHN THOMSON, OF BROOKLYN, ASSIGNOR TO THE NEPTUNE METER COMPANY, OF NEW YORK, N. Y., AND NEWARK, NEW JERSEY.

PROPORTIONAL WATER-METER.

SPECIFICATION forming part of Letters Patent No. 515,378, dated February 27, 1894.

Application filed May 11, 1893. Serial No. 473,770. (No model.)

*To all whom it may concern:*

Be it known that I, JOHN THOMSON, a citizen of the United States, residing at Brooklyn, in the county of Kings and State of New York, have invented certain new and useful Improvements in Proportional Water-Meters, of which the following is a specification.

My invention relates to proportional water meters, and has for its object to improve and simplify the construction and arrangement of parts of such meters, and it relates more particularly to that general class of proportional water meters such as are described, shown and claimed in my prior applications, Serial No. 458,720, filed January 17, 1893, and Serial No. 466,123, filed March 15, 1893, and the special features of the present invention consist in simplifying the construction and arrangement of parts of a meter arranged to operate in accordance with the method set forth and claimed in said applications, and the invention consists in the features of construction substantially as hereinafter pointed out.

Figure 1:
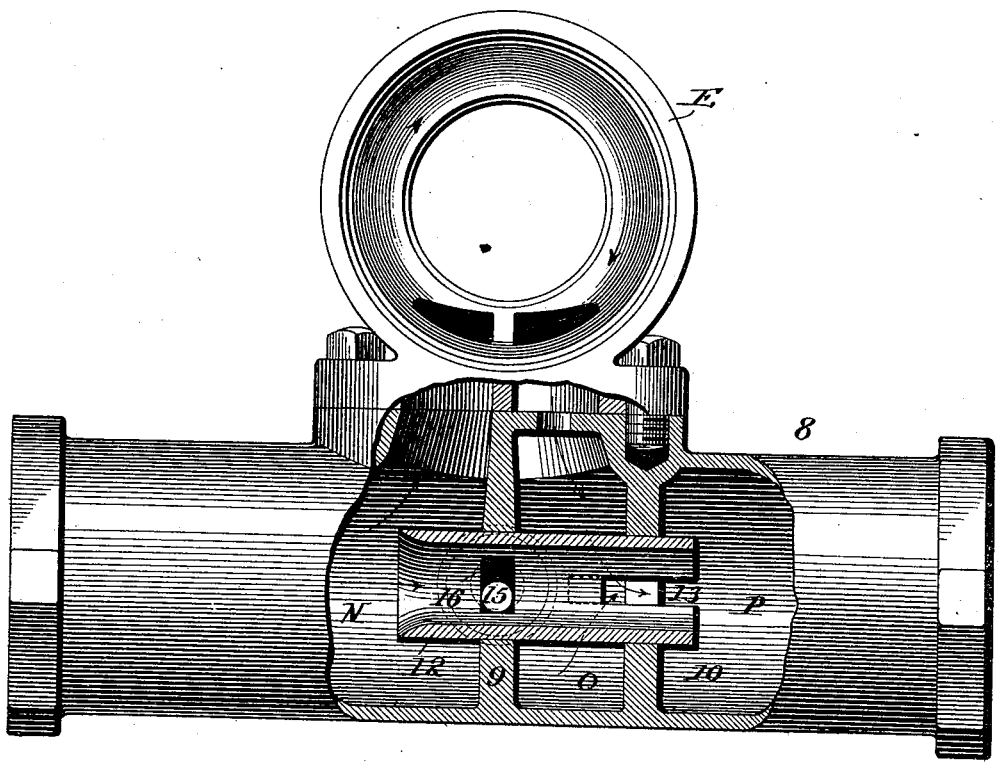
Figure 2:
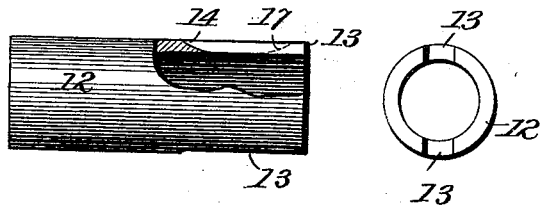

Referring to the accompanying drawings, wherein I have illustrated sufficient of a meter of the class described to enable those skilled in the art to understand my invention, Figure 1, is a bottom plan view of a measuring meter, the inclosing cap and internal mechanism being removed, and a part horizontal section of the main casing, and the proportional controlling device; and Fig. 2, is a detached detail side and end view of the tube, which in its functions comprises the most essential features of the said proportional controlling device.

It is not deemed necessary to fully illustrate and describe all the details of construction of all the parts of the proportional meter, as these may be varied somewhat and their general features and arrangement are understood, and it is sufficient to say that the case E of the measuring device is adapted to receive the measuring and registering mechanism, and is preferably provided with an inclosing cap, fitting the end of the case E, all of which mechanism is omitted in the present instance. As in the former cases, the measuring device is connected to the proportional controlling device in such a manner that the flow of the measured proportional part of the water is caused to be deflected from the main stream in the form of an approximately circular loop, the loop, inlet and outlet all lying in substantially the same plane. The main casing 8, contains the proportional controlling device and is divided by diaphragms 9, 10 into three compartments or chambers, N being the inlet, O the intermediate, and P the outlet chamber. These diaphragms are perforated near their centers, and the proportional controlling device is mounted therein. The proportional controlling device in the present case consists of a simple cylindrical tube 12, arranged to slide in the openings in the diaphragms or septums 9, 10, and the inlet end is preferably tapered to present sharp edges to the inlet chamber, although this is not absolutely necessary.

In order to provide an exit from the chamber O to the chamber P of the measured stream and preferably to provide means for producing an efficient suction effect or induction, the controlling tube 12, is formed with one or more slots 13, two being shown in the present instance, although any desired number may be used. These slots can be quickly, readily and accurately formed in the tube, by a simple milling operation, and it will be seen that this operation leaves the inner ends of the slots tapered as at 14, Fig. 2, thus presenting desirable openings for the passage of the water from the chamber O through the tube into the outlet chamber P, and by simply sliding the tube in the diaphragms or septums, an accurate and efficient adjustment may be provided, so that the desired amount of suction or inductive effect may be produced, and this effect may be increased or decreased very quickly and easily by simply shifting the tube back or forth in its bearings, thereby varying the area of the open slot with respect to the diaphragm 10.

While I have shown the slots or openings 13 as being longitudinal and extending to the end of the tube, it is evident that it is not necessary that they should extend clear through to the end, but may terminate at any suitable point, as indicated in dotted lines 17. Other ways of forming the openings may be employed, and while that described is the preferred form, it is only essential that the tube itself should be provided with an opening or openings through which the measured stream may pass, the tube being made adjustable to regulate the flow through said opening or openings.

Various means may be used for adjusting the tube, and I have found the one illustrated in the accompanying drawings, and which is shown more particularly in my former application, Serial No. 466,123, to be efficient, and it consists essentially of an eccentric stud 15, mounted on a spindle which may be extended outwardly through suitable packing to the exterior of the case, and which engages an elongated slot 16 in the side of the tube, and in this way the adjustment may be readily accomplished, and the meter standardized while in operation. It will thus be seen that from this construction, not only is a clear space or spaces provided in the slot of the tube for the discharge of the measured water received from or passing to the measuring device while the main stream is passed through the bore of the tube, but that from a practical or manufacturing stand-point, the construction is exceedingly simple, as the only operation or tooling required consists in simply boring the holes through the diaphragms 9 and 10, and forming the slots in the tube by a simple milling apparatus, while the tube is detached from the main casing, and it will be seen that the inner terminations of the slots, as at 14, are finished tapering or rounding, and may be polished to afford a rational deflection to the flowing water from chamber O, and when the tube is slipped in position, it can be readily and accurately adjusted to produce the desired induction effects.

What I claim is—

1. In a proportional water meter, a proportional controlling device, consisting of an open tube provided with a slot or slots for delivering the measured quantity of water, the unmeasured portion passing through the main bore of said tube, substantially as described.

2. In a proportional water meter, a proportional controlling device, consisting of an open tube with a longitudinal slot or slots, in combination with a main casing having a diaphragm in which the tube is mounted, substantially as described.

3. In a proportional water meter, a proportional controlling device, consisting of an open tube provided with a longitudinal slot or slots, in combination with the main case, having two diaphragms forming three chambers, a measuring device connected to the case, and means for adjusting the controlling tube in the diaphragms, substantially as described.

4. In a proportional water meter, the combination with a main case having the bored diaphragms; of a proportional controlling device, consisting of a tube, having a slot or slots, and means for adjusting the relations of the slots to one of the diaphragms, substantially as described.

In testimony whereof I have signed my name to this specification in the presence of two subscribing witnesses.

JOHN THOMSON.

Witnesses:
ROBERT S. CHAPPELL,
JOHN McKINNON.